US009264205B2

(12) United States Patent
Celebi et al.

(10) Patent No.: US 9,264,205 B2
(45) Date of Patent: Feb. 16, 2016

(54) FULL DUPLEX COMMUNICATION IN THE PRESENCE OF MIXED FULL AND HALF DUPLEX USERS

(71) Applicant: QUALCOMM Incorporated, San Diego, CA (US)

(72) Inventors: Samel Celebi, Summit, NJ (US); Luca Blessent, Bridgewater, NJ (US); Niranjan Nayak Ratnakar, Bridgewater, NJ (US); Raja Sekhar Bachu, Kendall Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 14/060,451

(22) Filed: Oct. 22, 2013

(65) Prior Publication Data

US 2015/0109969 A1    Apr. 23, 2015

(51) Int. Cl.
*H04L 5/00* (2006.01)
*H04L 5/16* (2006.01)
*H04L 5/14* (2006.01)
*H04W 72/04* (2009.01)

(52) U.S. Cl.
CPC ............ *H04L 5/0085* (2013.01); *H04L 5/0007* (2013.01); *H04L 5/0073* (2013.01); *H04L 5/1461* (2013.01); *H04L 5/16* (2013.01); *H04L 5/0044* (2013.01); *H04L 5/143* (2013.01); *H04W 72/048* (2013.01)

(58) Field of Classification Search
CPC .............................. H04W 76/04; H04W 28/02
USPC ......... 370/281, 329, 277, 252, 278, 235, 279, 370/280, 295; 455/67.11
See application file for complete search history.

(56) References Cited

U.S. PATENT DOCUMENTS

| 6,069,883 | A  | * | 5/2000 | Ejzak et al. ................... 370/335 |
|---|---|---|---|---|
| 6,324,405 | B1 | * | 11/2001 | Young et al. ............... 455/456.1 |
| 6,580,795 | B1 | * | 6/2003 | Li et al. .................... 379/406.14 |
| 7,499,515 | B1 | * | 3/2009 | Beadle .......................... 375/358 |
| 8,811,240 | B2 | * | 8/2014 | Chindapol et al. ............ 370/281 |
| 2003/0099286 | A1 | * | 5/2003 | Graziano et al. .............. 375/222 |
| 2006/0023649 | A1 | * | 2/2006 | Tillet et al. ................... 370/310 |
| 2006/0025165 | A1 | * | 2/2006 | Tillet et al. ................... 455/517 |
| 2007/0217433 | A1 | * | 9/2007 | Doppler et al. ............... 370/400 |

(Continued)

OTHER PUBLICATIONS

Bharadia D., et al., "Full Duplex Radios", SIGCOMM, ACM, 2 Penn Plaza, Suite 701 New York NY 10121-0701 USA, Aug. 27, 2013, pp. 375-386, XP058030650, DOI: 10.1145/2486001.2486033 ISBN: 978-1-4503-2056-6.
Partial International Search Report—PCT/US2014/061426—ISA/EPO—Jan. 5, 2015. (7 total pages).
Tapio V., et al., "DUPLO Deliverable D1.1 System Scenarios and Technical Requirements for Full-Duplex Concept", May 2, 2013, XP055158748, Retrieved from the Internet: URL:http://cordis.europa.eu/docs/projects/cnect/9/316369/080/deliverables/001-D11v10.pdf.

(Continued)

*Primary Examiner* — Parth Patel
(74) *Attorney, Agent, or Firm* — Arent Fox LLP

(57) ABSTRACT

A method, an apparatus, and a computer program product for providing full duplex (FD) wireless communication to an FD capable (FDC) user equipment (UE) among one or more UEs include determining allocations of one or more resource blocks (RBs) to the one or more UEs, determining FD capabilities and scheduling parameters of the one or more UEs, determining at least one FD portion and at least one half duplex (HD) portion in the one or more RBs based on the FD capabilities and the scheduling parameters of the one or more UEs, wherein a concurrent downlink (DL) and uplink (UL) communication is scheduled in the at least one FD portion, and adjusting the allocations of the one or more RBs based on the at least one FD portion and the at least one HD portion.

19 Claims, 11 Drawing Sheets

(56) References Cited

U.S. PATENT DOCUMENTS

| | | | |
|---|---|---|---|
| 2007/0268848 A1* | 11/2007 | Khandekar et al. | 370/295 |
| 2008/0239957 A1* | 10/2008 | Tokura et al. | 370/235 |
| 2009/0180402 A1* | 7/2009 | Lindoff et al. | 370/277 |
| 2009/0190536 A1* | 7/2009 | Zhang et al. | 370/329 |
| 2010/0080323 A1* | 4/2010 | Mueck et al. | 375/296 |
| 2010/0091725 A1* | 4/2010 | Ishii | 370/329 |
| 2010/0105390 A1* | 4/2010 | Ishii | 455/436 |
| 2010/0110942 A1* | 5/2010 | Cai et al. | 370/279 |
| 2010/0157826 A1* | 6/2010 | Yu et al. | 370/252 |
| 2010/0182930 A1* | 7/2010 | Gentle et al. | 370/252 |
| 2010/0265874 A1* | 10/2010 | Palanki et al. | 370/315 |
| 2010/0273515 A1* | 10/2010 | Fabien et al. | 455/509 |
| 2011/0222445 A1* | 9/2011 | Alanara | 370/281 |
| 2012/0113920 A1 | 5/2012 | Cheng et al. | |
| 2012/0207038 A1* | 8/2012 | Choi et al. | 370/252 |
| 2013/0021954 A1 | 1/2013 | Montojo et al. | |
| 2013/0051288 A1 | 2/2013 | Yamada et al. | |
| 2013/0083704 A1* | 4/2013 | Gaal et al. | 370/277 |
| 2013/0128778 A1 | 5/2013 | Bennett | |
| 2013/0128782 A1 | 5/2013 | Boixadera et al. | |
| 2013/0188536 A1 | 7/2013 | Pirskanen et al. | |
| 2013/0194984 A1* | 8/2013 | Cheng et al. | 370/294 |
| 2013/0223294 A1 | 8/2013 | Karjalainen et al. | |
| 2013/0229952 A1* | 9/2013 | Koskinen et al. | 370/278 |
| 2013/0301487 A1* | 11/2013 | Khandani | 370/278 |
| 2013/0316686 A1* | 11/2013 | Subbaramoo et al. | 455/418 |
| 2014/0307702 A1* | 10/2014 | Mese et al. | 370/330 |
| 2014/0328283 A1* | 11/2014 | Wan et al. | 370/329 |
| 2014/0342738 A1* | 11/2014 | Ishii | 455/436 |
| 2014/0348018 A1* | 11/2014 | Bharadia et al. | 370/252 |
| 2015/0049650 A1* | 2/2015 | Choi | 370/278 |

OTHER PUBLICATIONS

Huawei, "DRX operation for half-duplex UE in different TDD UL-DL configurations," 3GPP TSG-RAN WG2 Meeting #80, Nov. 12-16, 2012, New Orleans, LA, 3 pages.

Barghi S., et al., "Characterizing the Throughput Gain of Single Cell MIMO Wireless Systems with Full Duplex Radios", Modeling and Optimization in Mobile, Ad Hoc and Wireless Networks (WIOPT), 2012 10th International Symposium on, IEEE, May 14, 2012, pp. 68-74, XP032216574, ISBN: 978-1-4673-2294-2.

International Search Report and Written Opinion—PCT/US2014/061426—ISA/EPO—Apr. 9, 2015. (19 total pages).

New Postcom : "Downlink control signaling enhancements", 3GPP Draft; R1-112986_Downlink Control Signaling Enhancements, 3rd Generation Partnership Project (3GPP), Mobile Competence Centre; 650, Route Des Lucioles; F-06921 Sophia-Antipolis Cedex; France, vol. RAN WG1, No. Zhuhai; Oct. 10, 2011, Oct. 3, 2011, pp. 1-4, XP050538056, [retrieved on Oct. 3, 2011].

Radunovic B., et.al. "Rethinking Indoor Wireless: Low Power, Low Frequency, Full-duplex" Microsoft Technical Report MSR-TR-2009-148 (7 total pages).

Lo A. et al., "Performance of In-band Full-Duplex Amplify-and-Forward and Decode- and-Forward Relays with Spatial Diversity for Next Generation Wireless Broadband," IEEE Int'l conf on Information Networks, ICOIN 2011, pp. 290-294.

Choi J. et al., "Achieving Single Channel, Full Duplex Wireless Communication," Mobicom 2010, pp. 1-12).

\* cited by examiner

FULL DUPLEX COMMUNICATION IN THE PRESENCE OF MIXED FULL AND HALF DUPLEX USERS

BACKGROUND

The present disclosure relates generally to communication systems, and more particularly, to full duplex communication in the presence of mixed full and half duplex users.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Conventionally, the signals in the uplink (UL, or reverse link) and the signals in the downlink (DL or forward link) are transmitted either in different frequency hands (e.g., by frequency domain duplexing (FDD)) or in the same frequency band but in different time slots (e.g., by time domain duplexing (TDD)). This method of separating UL and DL transmissions is referred to as half duplex (HD) communication. The separation of the signals in either frequency or time domain eliminates the possibility of a strong transmit signal of a user to drown a weak signal received by that same user. However, there may be users that have full duplex (FD) capability, hereinafter referred to as FD capable (FDC) users, such as users that are equipped with an echo canceller which allows them to receive and decode signals while also transmitting. In the existing radio access technologies (e.g., LTE), such FDC users are conventionally serviced as legacy users with no FD capability.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method for providing full duplex (FD) wireless communication to an FD capable (FDC) user equipment (UE) among one or more UEs is provided that includes determining allocations of one or more resource blocks (RBs) to the one or more UEs; determining FD capabilities and scheduling parameters of the one or more UEs; determining at least one FD portion and at least one HD portion in the one or more RBs based on the FD capabilities and the scheduling parameters of the one or more UEs, wherein a concurrent DL and UL communication is scheduled in the at least one FD portion; and adjusting the allocations of the one or more RBs based on the at least one FD portion and the at least one HD portion.

In another aspect, an apparatus for providing FD wireless communication to an FDC UE among one or more UEs is provided that includes a processing system configured to determine allocations of one or more RBs to the one or more UEs; determine FD capabilities and scheduling parameters of the one or more UEs; determine at least one ED portion and at least one HD portion in the one or more RBs based on the ED capabilities and the scheduling parameters of the one or more UEs, wherein a concurrent DL and UL communication is scheduled in the at least one FD portion; and adjust the allocations of the one or more RBs based on the at least one FD portion and the at least one HD portion.

In a further aspect, a computer program product for providing FD wireless communication to an FDC UEs among one or more UEs in provided that includes a computer-readable medium comprising code for determining allocations of one or more RBs to the one or more UEs; code for determining FD capabilities and scheduling parameters of the one or more UEs; code for determining at least one FD portion and at least one HD portion in the one or more RBs based on the FD capabilities and the scheduling parameters of the one or more UEs, wherein a concurrent DL and UL communication is scheduled in the at least one FD portion; and code for adjusting the allocations of the one or more RBs based on the at least one FD portion and the at least one HD portion.

These and other aspects of the present disclosure will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspect of the present disclosure provide a scheduling approach that improves the overall network capacity in a wireless network by managing the service of users that have fall duplex (FD) capability (e.g., users that are equipped with an echo canceller which allows them to receive and decode signals while also transmitting), hereinafter referred to as FD capable (FDC) users. Some aspects may be applied to the existing radio access technologies (e.g., LTE) without disrupting the legacy users. Some present aspects may be used in indoor scenarios where the path losses are relatively small, the transmit powers are low, and only few users are serviced, such as small cell (e.g., femto and pico cell, or any cell having a relatively small transmit power or coverage area relative to a macro cell) deployments. The present aspects, however, are not limited to indoor scenarios or small cell deployments, and may be used in an scenario or cell deployment.

Figure 1:
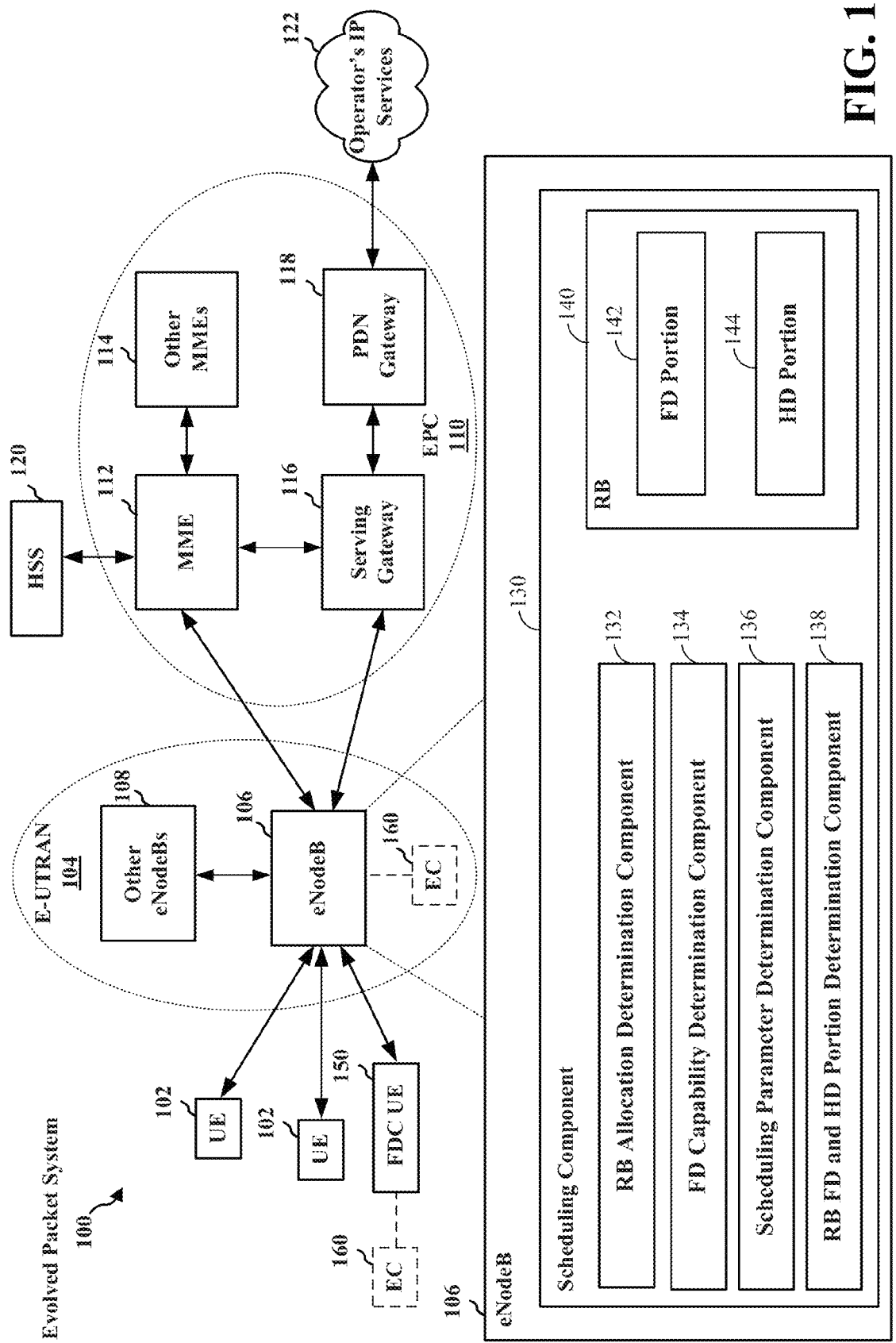
FIG. 1 is a diagram illustrating an example of a network architecture for full duplex communication in the presence of mixed full and half duplex users.

Referring to FIG. 1, an LTE network architecture 100 is illustrated which may be referred to as an Evolved Packet System (EPS) 100. EPS 100 includes one or more FDC user equipments (UEs) 150 and one or more other UEs 102 which may not have FD capability. EPS 100 may further include an Evolved UMTS Terrestrial Radio Access Network (E-UTRAN) 101, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched. services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the FDC UEs 150 and UEs 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for FDC UEs 150 and UEs 102. Examples of FDC UEs 150 and UEs 102 include a cellular phone, a smart phone, a session initiation protocol (SIP) phone, a laptop, a personal digital assistant (PDA), a satellite radio, a global positioning system, a multimedia device, a video device, a digital audio player MP3 player), a camera, a game console, or any other similar functioning device. FDC UEs 150 and UEs 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an user equipment, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

According to some present aspects, when HD capability is enabled on eNodeB 106 and FDC UE 150, eNodeB 106 may execute a scheduling component 130 that takes advantage of the FD capability of FDC UE 150 to perform FD scheduling to increase the overall system capacity and enable FDC UE 150 to experience higher data rates. Also, in these aspects, when scheduling component 130 schedules eNodeB 106 to transmit in FD mode, eNodeB 106 may complete the data transfers faster, thus opening new time slots to be used by other UEs, such as UEs 102 or other FDC UEs. Therefore, in these aspects, both the FDC UE 150 and the other UEs 102 (indirectly due to the resources vacated resources by the FDC UE 150) may benefit from FD scheduling.

Conventionally, the signals in the uplink (UL or reverse link) and the signals in the downlink (DL or forward link) are transmitted either in different frequency bands (e.g., by frequency domain duplexing (FDD)) or in the same frequency band but in different time slots (e.g., by time domain duplexing (TDD)). This separation of UL and DL transmissions is referred to as half duplex (HD) communication. The separation of the signals in either frequency or time domain eliminates the possibility of a strong transmit signal of a user to drown a weak signal received by that same user.

Some aspects of the present disclosure, however, use echo cancellation (EC) to enable simultaneous UL and DL transmissions in the same frequency band and/or the same time domain allocation, which is referred to as FD communication. For example, eNodeB 106 or FDC UE 150 may optionally include an EC component 160 configured to perform EC for FD communication. In some other aspects, FD communication may be achieved without EC, or with a technique different than EC. For example, when the coupling between the transmit and receive paths (e.g. the leakage from the transmit to the receive path) of eNodeB 106 and FDC UE 150 is small, EC may not be required to achieve FD communication. In some aspects, such small leakage is achieved by using directional antennas where the transmit and receive antennas have high gains in only a narrow range of angles, thus transmitting/receiving only to/from desired parties. In these aspects, the channel capacity in FD communication may be increased (e.g., doubled) compared to its HD counterpart. In some aspects, EC may be used to remove that portion of the transmit signal of a user that leaks into the receiver of that same user. In some aspects, EC may be employed through a combination of analog and digital cancellation techniques. In some aspects, EC is easier to realize and is more effective when the difference between the transmit power level and the received power level at a user is relatively small, e.g., in an indoor environment where the path loss between eNodeB 106 and FDC UE 150 is relatively small.

In some aspects, a scheduling method is utilized in EPS 100 to improve the overall network capacity in EPS 100 by managing the service of the users with FD capability, e.g., FDC UE 150. These aspects may be applied to the existing radio access technologies without disrupting HD capable (HDC) users, e.g., users that can only either receive or transmit at any given moment in time. In some aspects, a scheduling entity which may be, for example, included in eNodeB 106 or may be a higher layer entity that resides outside eNodeB 106, is made aware of the FD capabilities of individual UEs. For example, in one non-limiting aspect, eNodeB 106 may include scheduling component 130 that is made aware of the ED capabilities of individual UEs by pre-configuring the system or by having the UEs announce their FD capabilities through a messaging mechanism such as a radio resource control (RRC) protocol. For example, scheduling component 130 may include FD capability determination component 134 that determines FD capabilities of UEs, e.g., FDC UE 150 and UEs 102, by obtaining the FD capabilities pre-programmed in eNodeB 106 and/or stored in a network entity a-priori for FDC UE 150 and UEs 102, or by obtaining the ED capabilities from FDC UE 150 and UEs 102 by decoding broadcast messages from FDC UE 150 and UEs 102.

Aspects of the present disclosure are not limited to a particular radio access technology (RAT), and for example, can be applied to standards based technologies such as LTE, UMTS, EvDO, Wifi, as well as proprietary technologies. In some aspects, for example, at any given time, UL and DL communications are carried out using different RATs, e.g., DL can be LTE while UL can be Wifi. For example, in some aspects, concurrent DL and UL communication are carried out where a DL communication is in a first RAT and a UL communication is in a second RAT different than the first RAT.

Generally, in some aspects, a resource block (RB) is a contiguous, granular block of area that defines the boundaries of the data transmission in time and frequency domains. Conventionally, for HDC UEs and HDC eNodeBs, UL and DL communication are allocated to different RBs, UL RBs and DL RBs. For example, a DL RB may be used by either the eNodeB or the UE for transmissions that take place in a frequency band dedicated to DL in an FDD system, or in the time slots that are dedicated to DL in a TDD system. Such DL RBs are hereinafter referred to as legacy DL RBs (LDL RBs). Similarly, a UL RB may be used by either the eNodeB or the UE for transmissions that take place in a frequency band dedicated to UL in FDD system, or in the time slots that are dedicated to UL in a TDD system. Such UL RBs are hereinafter referred to as legacy UL RBs (LUL RBs).

In some present aspects, however, when eNodeB 106 and/or scheduling component 130 determine that eNodeB 106 is FD capable, at each scheduling opportunity, eNodeB 106 and/or scheduling component 130 may assign some of the LDL RBs and LUL RBs for FD communication based on other UE criteria, for example, duplexing capabilities, traffic demands, AT requests, buffer size, channel conditions, signal quality, power, latency requirements, or quality of service (QoS) requirements. Such RBs are hereinafter referred to as FD RBs. In these aspects, the eNodeB 106 may then schedule the FD RBs amongst the UEs. For example, in some aspects, scheduling component 130 of eNodeB 106 may include RB allocation determination component 132 that determines allocations of one or more RBs 140 to FDC UE 150 and other UEs 102 which may include LDL RBs and LUL RBs. Further, scheduling component 130 of eNodeB 106 may include RB FD portion and HD portion determination component 138 that determines at least one FD portion 142 and at least one HD portion 144 in the RBs 140 based on the FD capabilities of the FDC UE 150 and other UEs 102 (determined by FD capability determination component 134) and scheduling parameters of FDC UE 150 and other UEs 102, where concurrent DL and UL communication is scheduled in the FD portions 142. In these aspects, scheduling component 130 of eNodeB 106 may include scheduling parameter determination component 136 that determines scheduling parameters of FDC UE 150 and other UEs 102, e.g., traffic demands, UE requests, buffer size, channel conditions, signal quality, power, latency requirements, or QoS requirements.

In some aspects, the eNodeB 106 may assign LUL RBs to a subset of UEs for UL transmission, thereby providing the subset of UEs with UL RBs that are orthogonal to each other in the time and frequency domains. In these aspects, the eNodeB 106 may establish FD communication with FDC UE 150 by transmitting on a subset of the LUL RBs to the FDC UE 150 while receiving on that same subset of the LUL RBs from the FDC UE 150.

In some aspects, the assignment of the RBs 140 used for DL communication of the FDC UE 150 may be implicit (e.g., the eNodeB 106 to FDC UE 150 LDL RB assignments may be identical to the FDC UE 150 to eNodeB 106 LUL RB assignments) or may be separately communicated to FDC UE 150 through a control channel. In some aspects, for example, when a DL (or UL) assignment is made by eNodeB 106, there is an express understanding between eNodeB 106 and FDC UE 150 that the same resources are allocated for the UL (or DL) transmission as well. In these aspects, the UL communication between eNodeB 106 and other UEs 102 is HD (e.g., HDC UEs transmit UL data to eNodeB 106 in their assigned UL RBs but do not receive DL data from eNodeB 106 in LUL RBs).

In some aspects, in order to reduce the interference to the UL channel of neighboring eNodeBs 108, eNodeB 106 may make its DL transmissions contingent upon the path loss between itself and its neighboring eNodeBs 108, for example, the minimum path loss between itself and its neighboring eNodeBs 108. In these aspects, the path loss between eNodeB 106 and eNodeBs 108 may be measured through a network listening component.

In one aspect, for example, eNodeB 106 may have a single UE, e.g., FDC UE 150, in a given scheduling opportunity. In this aspect, eNodeB 106 and FDC UE 150 may use the available RBs for FD communication.

In some aspects, eNodeB 106 may assign mutually orthogonal LDL RBs to a subset of UEs for DL transmission. In one aspect, for example, eNodeB 106 may schedule UL transmissions in an LDL RB assigned to an FDC UE, e.g., FDC UE 150, within the subset of UEs when FDC UE 150 is the only UE served in the network. In another aspect, for example, when there is more than one UE in the network, some of the LDL RBs may be assigned to the FDC UEs (e.g., FDC UE 150) within the subset of UEs for UL transmission, as long as those LDL RBs are not used by eNodeB 106 for transmitting special resources such as DL control, broadcast, pilot, or synchronization channels. For example, in some aspects, when in FD mode, FDC UE 150 does not transmit UL data in RBs that are used by DL control and reference channels. In yet another aspect, for example, when the path loss between FDC UE 150 and other UEs within the subset of UEs is higher than a threshold, some of the LDL RBs may be assigned to FDC UE 150 for UL transmission. In these aspects, the path loss between the UEs may be measured, for example, by using device to device links between the UEs. Conventionally, path loss information between the UEs may be used to control interference, for example, by power control. In some present aspects, however, such path loss information between the UEs may further be used for FD scheduling determination. In some aspects, the assignment of the UL communication may be implicit, e.g., the FDC UE 150 to eNodeB 106 LUL RB assignments may be the same as the eNodeB 106 to FDC UE 150 LDL RB assignments. Alternatively, in some aspects, the FDC UE 150 to eNodeB 106 LDL RB assignments may be separately communicated to FDC UE 150 through a control channel. In some aspects, the DL communication between HDC UEs within the subset of UEs is carried out in HD, e.g., HDC UEs only receive data in LDL RBs but do not transmit in LDL RBs.

Conventionally, in the LTE standards, a downlink assignment, e.g., a physical downlink control channel (PDCCH), and its corresponding downlink data channel, e.g., a physical downlink shared channel (PDSCH), are sent in the same sub-frame. Accordingly, while the downlink data may be readily decoded at FDC UE 150, there may not be enough processing time at FDC UE 150 to make an FD transmission in the corresponding PDSCH resource. Some present aspects, however, provide modifications to the LTE standards to support FD transmission, for example, by staggering PDCCH and PDSCH channels on DL transmissions during the LDL RBs. In these aspects, alternatively or additionally, hybrid automatic repeat request (HARQ may be optional during LDL RBs for FDC UE 150 to eNodeB 106 LDL RB transmissions. For example, in some aspects, the downlink assignment is indicated a number of sub-frames prior to the downlink data transmission. Accordingly, in these aspects, the PDCCH and the corresponding PDSCH transmissions are staggered by a number of sub-frames. Similarly, in some aspects, the uplink assignment sent over PDCCH for a corresponding uplink data channels, e.g., physical uplink shared channel (PUSCH), may be transmitted a number of sub-frames later, e.g., 4 sub-frames later.

In some aspects, for example, in FDD systems with synchronized DL transmission and UL reception, FD communication may be limited to select sub-bands. Accordingly, these aspects may provide control and cancellation of interference per sub-band basis. In these aspects, different FDC UEs 150 may be assigned to different sub-bands for FD communication.

Conventionally, for example, in an LTE TDD network, sub-frames or RBs may be allotted for UL, DL, or special (e.g., shared by DL and UL that are separated by a quiet guard interval) based on a pre-determined configuration table. In some present aspects, however, such pre-determined configuration table may be modified to provide ED transmission for FDC UEs 150 in the LTE TDD network. Table 1 shows one example of an aspect of a pre-determined configuration in an LTE TDD system that includes both HDC UEs and FDC UEs, and a corresponding modified configuration to provide ED communication to the FDC UEs in that LTE TDD system.

TABLE 1

An example of an aspect of a pre-determined configuration in an LTE TDD system and a corresponding modified configuration to provide FD communication

| | Sub-frame Number | | | | | | | | | |
|---|---|---|---|---|---|---|---|---|---|---|
| | 0 | 1 | 2 | 3 | 4 | 5 | 6 | 7 | 8 | 9 |
| Standard Configuration | DL | SW | UL | UL | UL | DL | SW | UL | UL | UL |
| Modified Configuration | DL | SW | FD | FD | UL | DL | SW | FD | UL | UL |
| FDC UE 1 | DL | | FD | | | UL | DL | | FD | UL | UL |
| FDC UE 2 | DL | | | FD | UL | DL | | | UL | UL |
| HDC UE 1 | DL | | | | UL | DL | | | UL | UL |
| HDC UE 2 | DL | | | | UL | DL | | | UL | UL |

In Table 1, SW represents a switch sub-frame that is a special sub-frame as described herein. As shown in the example of Table 1, in these aspects, an FDC access point (eNodeB 106) may re-assign an LUL RB as an FD RB, and assign these FD RBs to one of the FDC UEs for FD communication. For example, in Table 1, sub-frames 2 and 7 are assigned to FDC UE 1 for FD communication, and sub-frame 3 is assigned to FDC UE 2 for FD communication. Also, as shown in Table 1, HDC UEs 1 and 2 are not scheduled in FD sub-frames 2, 3, and 7, and remain quiet during these sub-frames.

In some aspects, for example, in an LTE TDD system, eNodeB 106 may not assign PRACH resources on FD RBs. In these aspects, alternatively or additionally, eNodeB 106 may assign an LDL RB as an FD RB to an FDC UE. In some aspects where an LUL RB is assigned as an FD RB, while the HDC UEs are not assigned and remain quiet during the FD RB, the HDC UEs may listen to some DL signals during FD RBs. Accordingly, the assigned FDC UE may puncture its UL transmission such that the FDC UE does not transmit data on the special resources of the FDC UE, such as DL control channel (PDCCH), cell specific reference tones (CRS), physical broadcast channel (PBCH), primary synchronization signal (PSS), and secondary synchronization signal (SSS).

In some aspects, EC component 160 may perform EC in the analog RF domain and/or in the digital domain. In these aspects, EC component 160 may perform digital cancellation after the received signal is digitized and sampled by an Analog to Digital Converter (ADC), to remove the portion of the transmit signal (e.g., the transmit signal of the same device that includes the EC component 160) that is leaking back into the receiver. In some aspects, EC component 160 may perform digital cancellation on the entire receiver band or only on a sub-band basis depending on whether or not there is FD communication in a particular sub-band. For example, in one aspect, in the case of LTE, a sub-band is a set of RBs. For example, in an aspect, in one non-limiting example LTE system with a total bandwidth of 20 MHz that is partitioned into two 10 MHz sub-bands (corresponding to, for example, 50 RBs per sub-band), FD communication may be performed only on sub-band I, and sub-band II may be used only for HD communication. In this example aspect, EC component 160 may perform digital cancellation for sub-band I only, and thereby reduce the resources required for performing EC (such as the computational power and energy), as EC is performed on only 50 RBs instead of 100 RBs.

In some aspects, in the absence of time and frequency domain synchronization between eNodeB 106 and FDC UE 150, some of the FD resources may overlap with the HD resources. For example, an RB that is originally intended for UL HD communication at time t1 may get DL interference from an FD resource whose timing synchronization has shifted over to t1 due to the lack of time synchronization. In another example, where FD communication is performed on sub-band I only, imperfect frequency synchronization may cause some of the sub-band I FD resources to leak into, for example, sub-band II HD resources and cause interference. Accordingly, in some aspects, FD communication requires the alignment of the resources in the time and frequency domains. For example, FD communication is performed with synchronization between the primary and secondary links to help in keeping the interference contained within the sub-bands and sub-frames that are assigned for FD communication. In these aspects, for example, in LTE where the uplink and downlink may not be synchronous, FD communication with synchronization between the primary and secondary links ensures that the HDC UEs do not get impacted by the interference caused by HD transmission.

Figure 9:
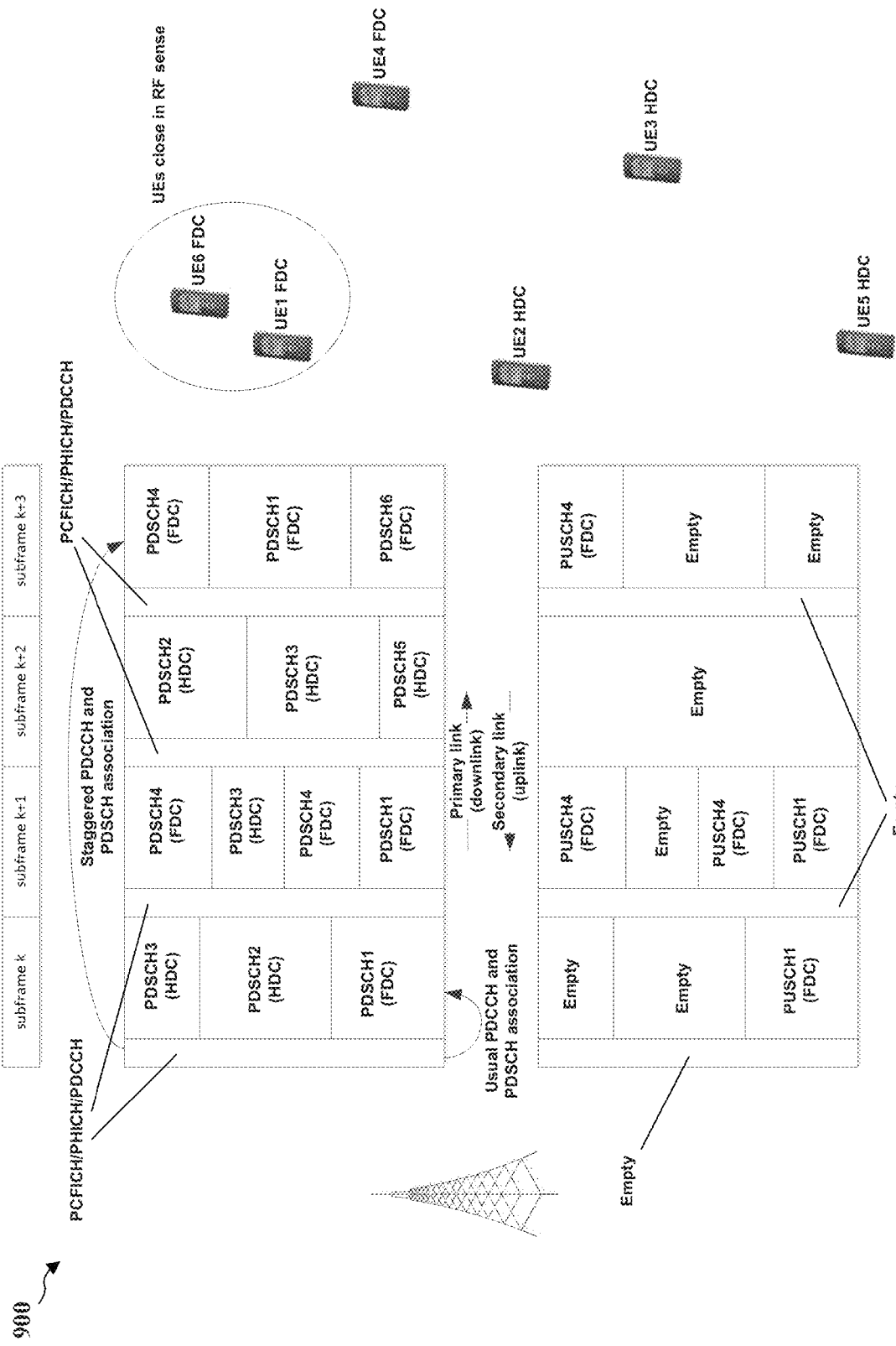
FIG. 9 is a diagram illustrating a first scheduling example when downlink is the primary link, including aspects of the network architecture of FIG. 1.

In some aspects, to perform FD communication, a frequency domain sub-band downlink assignment to a UE is used for uplink transmission by the same UE. For example, in some aspects, FDC UE 150 uses downlink sub-band RBs assigned by eNodeB 106 for UL and DL assignments. Accordingly, in these aspects, implicit scheduling of the secondary link (e.g., uplink) is performed based on the assignments for the primary link (e.g., downlink), One example of FD communication with such implicit assignment is shown in FIG. 9, where downlink is the primary link. For example, in the first scheduling example 900 illustrated in FIG. 9, in sub-frame k+2, there are RB assignments to HDC UEs only, and there are no uplink transmissions in sub-frame k+2. In sub-frames k and k+1, however, FDC UEs, e.g., UE1 and UE4, perform FD communication by transmitting in the uplink when they have assignments in the downlink. In this example, the FDC UEs are assumed to have non-empty data buffers.

Conventionally, in LTE, dynamic scheduling is employed in the downlink such that the assignment of PDCCH on a sub-frame provides data assignments (e.g., PDSCH) on the same sub-frame for some of the connected UEs based on QoS requirements and downlink channel conditions of the UEs. In some present aspects, however, when there are FDC UEs present, such dynamic scheduling is modified to better utilize the resulting additional resources such as a secondary link. Conventionally, in LTE, the downlink assignment (e.g., PDCCH) for a corresponding downlink data channel (e.g., PDSCH) is made in the same sub-frame as the downlink data channel. For example, as shown in the first scheduling example 900 in FIG. 9, the PDSCH assignments in sub-frame k are provided by PDCCH in the same sub-frame k. This does not allow enough processing time at a UE to make an FD transmission in the PDSCH resource.

In some present aspects, however, in order to support FD transmission, the LTE standard is modified to indicate the downlink assignment a few sub-frames prior to the downlink data transmission. For example, the PDCCH and the corresponding PDSCH transmissions may be staggered by, one or more sub-frames. For example, as shown in the first scheduling example 900 in FIG. 9, the PDSCH assignments in sub-frame k+3 are provided by PDCCH in sub-frame k.

In these aspects, dynamic scheduling is performed based on the FD capabilities of the UEs when assigning resources to the UEs. For example, FDC UEs which are close to other UEs in the RF sense (e.g., the uplink transmission of a FDC UE causes interference on the downlink reception at a nearby UE that may be FDC or HDC) are not assigned a same sub-frame on the primary link. Alternatively, FDC UEs may autonomously transmit on the secondary link only if they have no nearby UEs in the RF sense. For example, as shown in the first scheduling example 900 in FIG. 9, UE1 and UE6 which are FDC UEs are close to each other in the RE sense do not transmit on the secondary links during sub-frame k+3. In these aspects, the RF proximity of other UEs can be estimated by an FDC UE based on, for example, direct links (e.g., device to device or D2D links) between the UEs.

In some present aspects, in order to minimize interference on broadcast signals and channels in the downlink of other UEs, downlink resource elements with broadcast signals and channels are avoided in uplink transmission. For example, as shown in the first scheduling example 900 in FIG. 9, uplink transmission is avoided on the broadcast channels such as physical control format indicator channel (PCFICH), physical hybrid automatic repeat request indicator channel (PHICH), and PDCCH. However, the first scheduling example 900 in FIG. 9 is only an example, and uplink transmission may be further avoided during broadcast signal cell-specific reference signal (RS) and broadcast channel PBCH.

Figure 10:
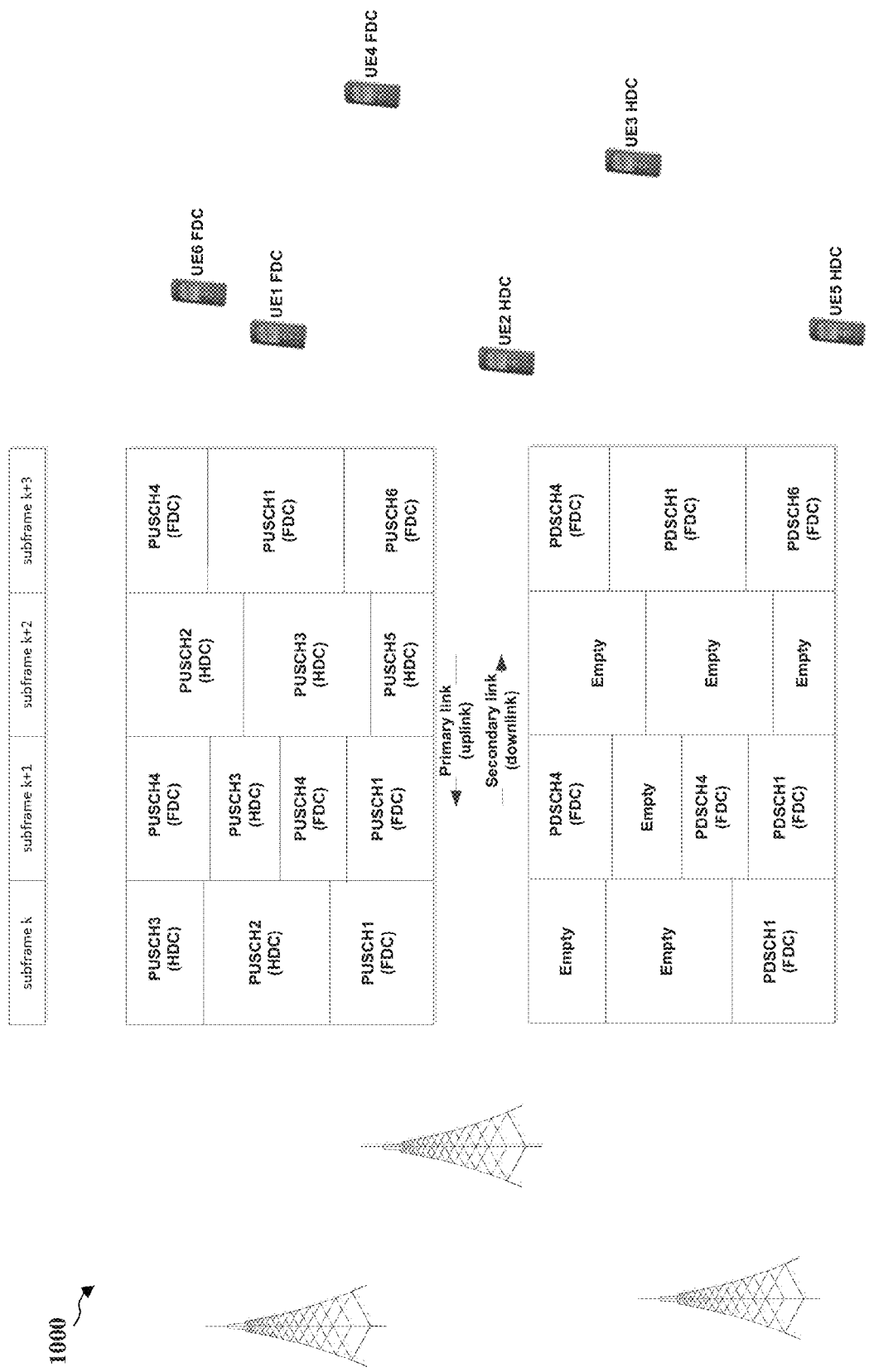
FIG. 10 is a diagram illustrating a second scheduling example when uplink is the primary link, including aspects of the network architecture of FIG. 1.
Figure 11:
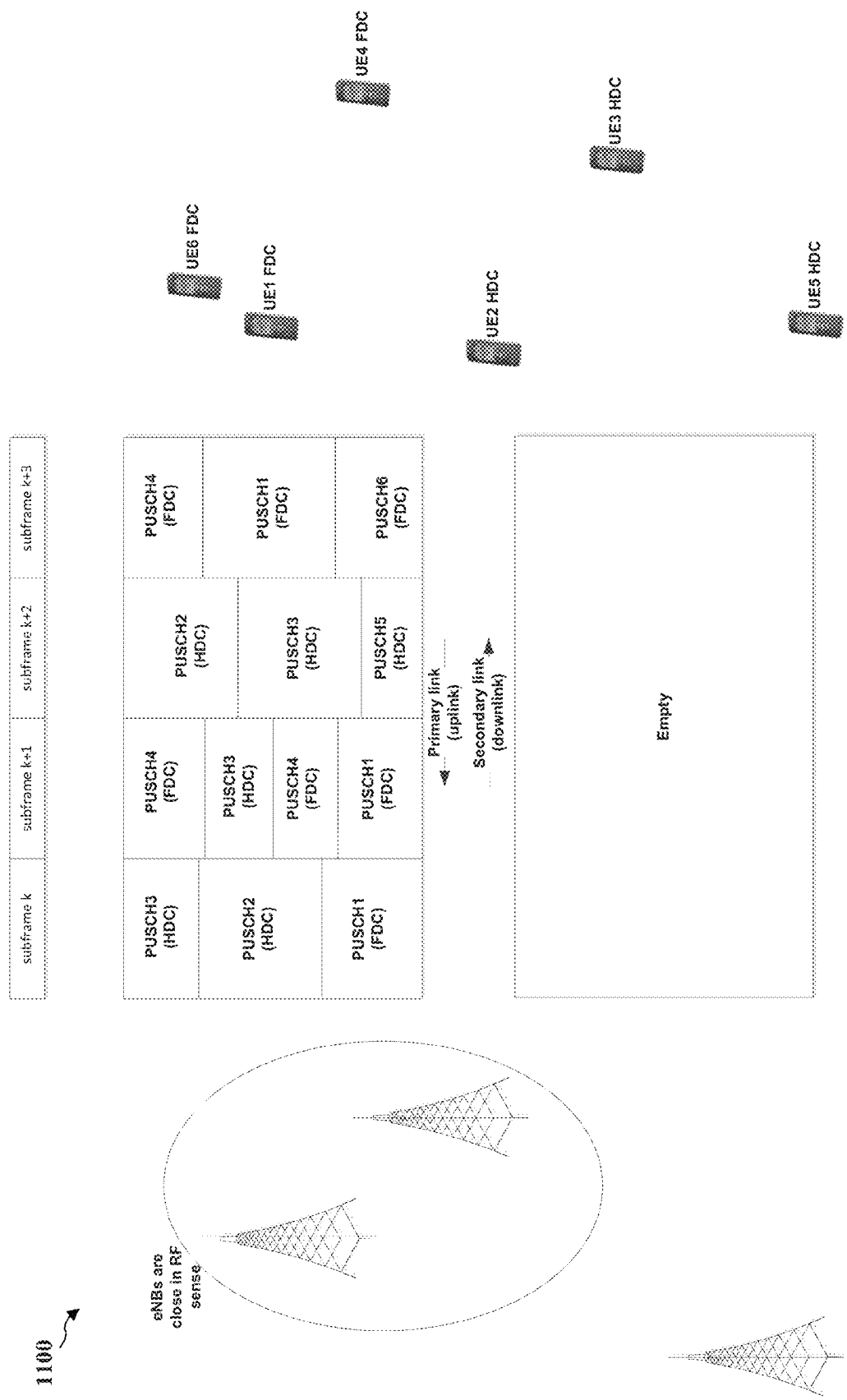
FIG. 11 is a diagram illustrating a third scheduling example when uplink is the primary link, including aspects of the network architecture of FIG. 1.

In some present aspects, the frequency domain uplink assignment to a UE is used for downlink transmission to the same UE for FD communication. Accordingly, implicit scheduling of the secondary link (downlink) based on the assignments for the primary link (uplink) is performed as shown, for example, in the second scheduling example 1000 in FIG. 10. Conventionally, in LTE, dynamic scheduling is performed in the uplink where, for example, for some of the connected UEs, the assignment channel PDCCH on a sub-frame provides data assignments (PUSCH) on a sub-frame which is a number of sub-frames (e.g., 3 sub-frames) away, based on, e.g., scheduling requests, buffer status reports, QoS requirements, and uplink channel conditions of the UEs. In some present aspects, however, when there are FDC UEs, such dynamic scheduling is modified to better utilize the resulting additional resources such as a secondary link. For example, in some present aspects, the dynamic scheduling is modified based on the FD capabilities of the UEs when assigning resources to the UEs. For example, in some present aspects, the secondary link (downlink) data channels (e.g., PDSCH) from an eNodeB are transmitted only to FDC UEs, as shown in the second scheduling example of FIG. 10 when there is no neighboring eNodeB that is close in the RF sense. In some other aspects, when there is a nearby eNodeB which is close in the RE sense, in order to minimize interference to the uplink at the neighboring eNodeBs, downlink transmission is contingent upon measurement of minimum path loss between an eNodeB and the neighboring eNodeBs that get interfered, as shown in the third scheduling example in FIG. 11 where the secondary link is not utilized. In these aspects, the path loss between the eNodeBs can be measured using network listen functionality at eNodeBs.

Figure 2:
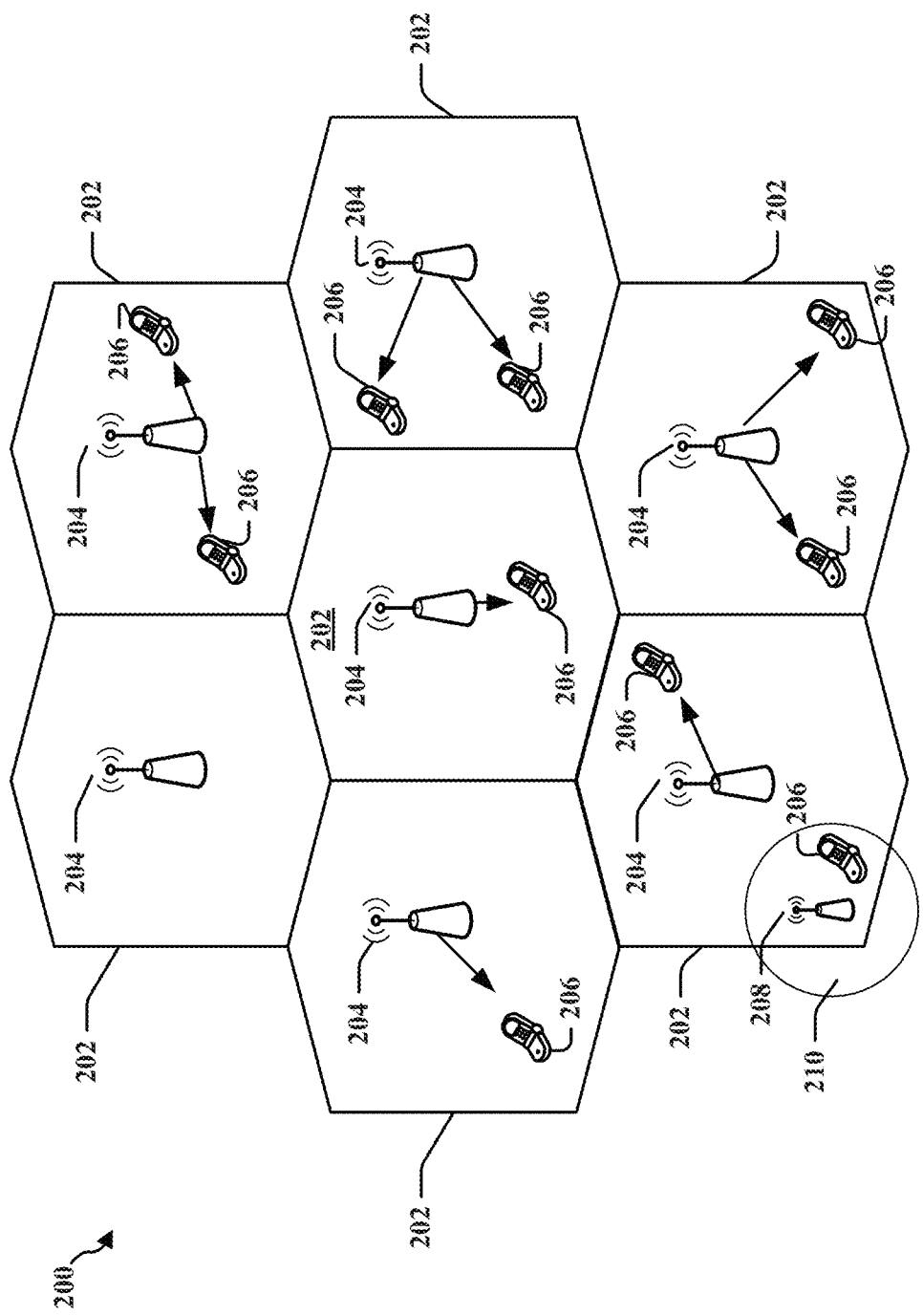
FIG. 2 is a diagram illustrating an example of an access network including aspects of the network architecture of FIG. 1.

Referring to FIG. 2, an example of an access network 200 in an LTE network architecture is illustrated. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.1 I (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
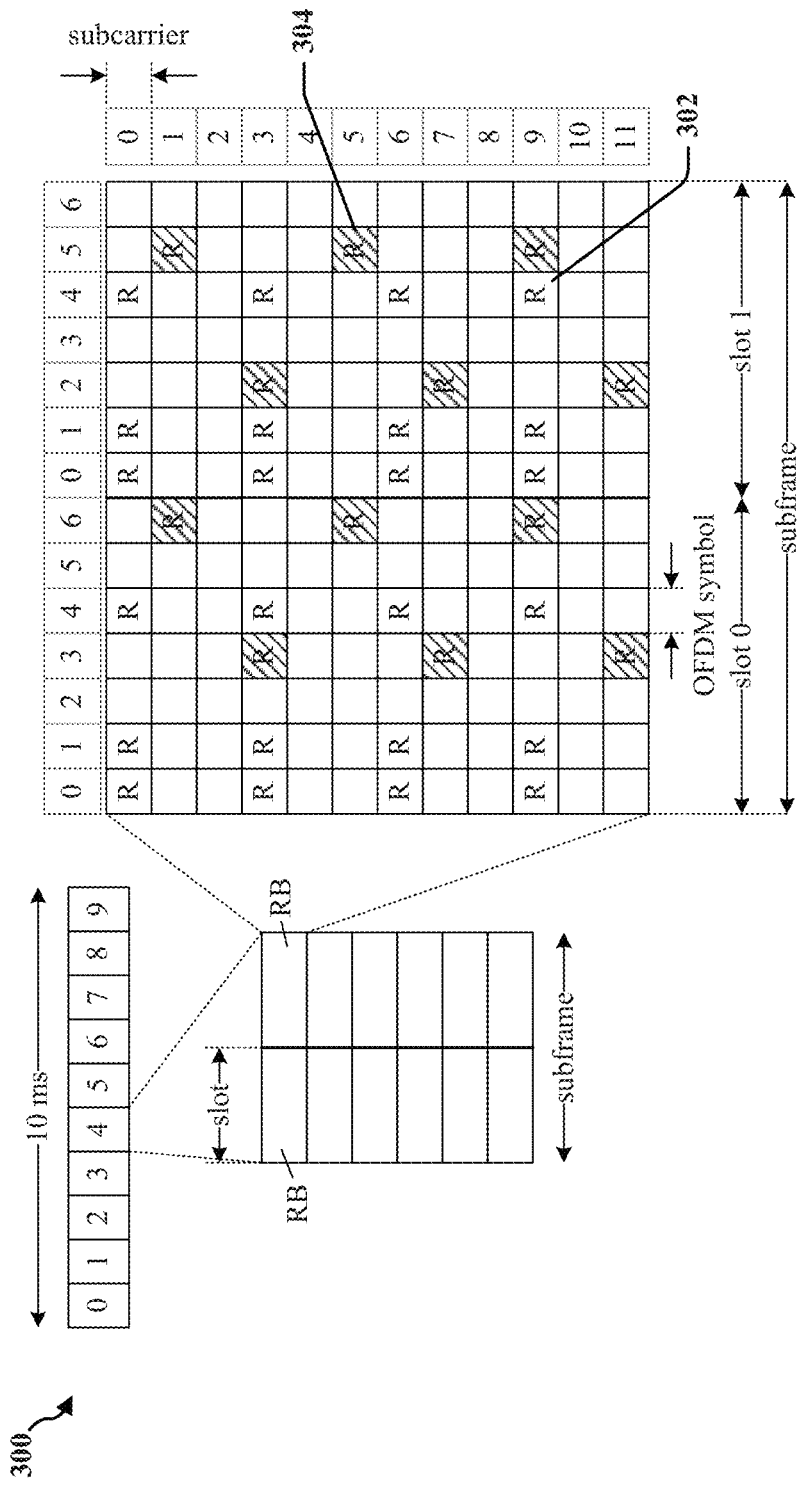
FIG. 3 is a diagram illustrating an example of a DL frame structure in LTE in aspects of the network architecture of FIG. 1.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Sonic of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
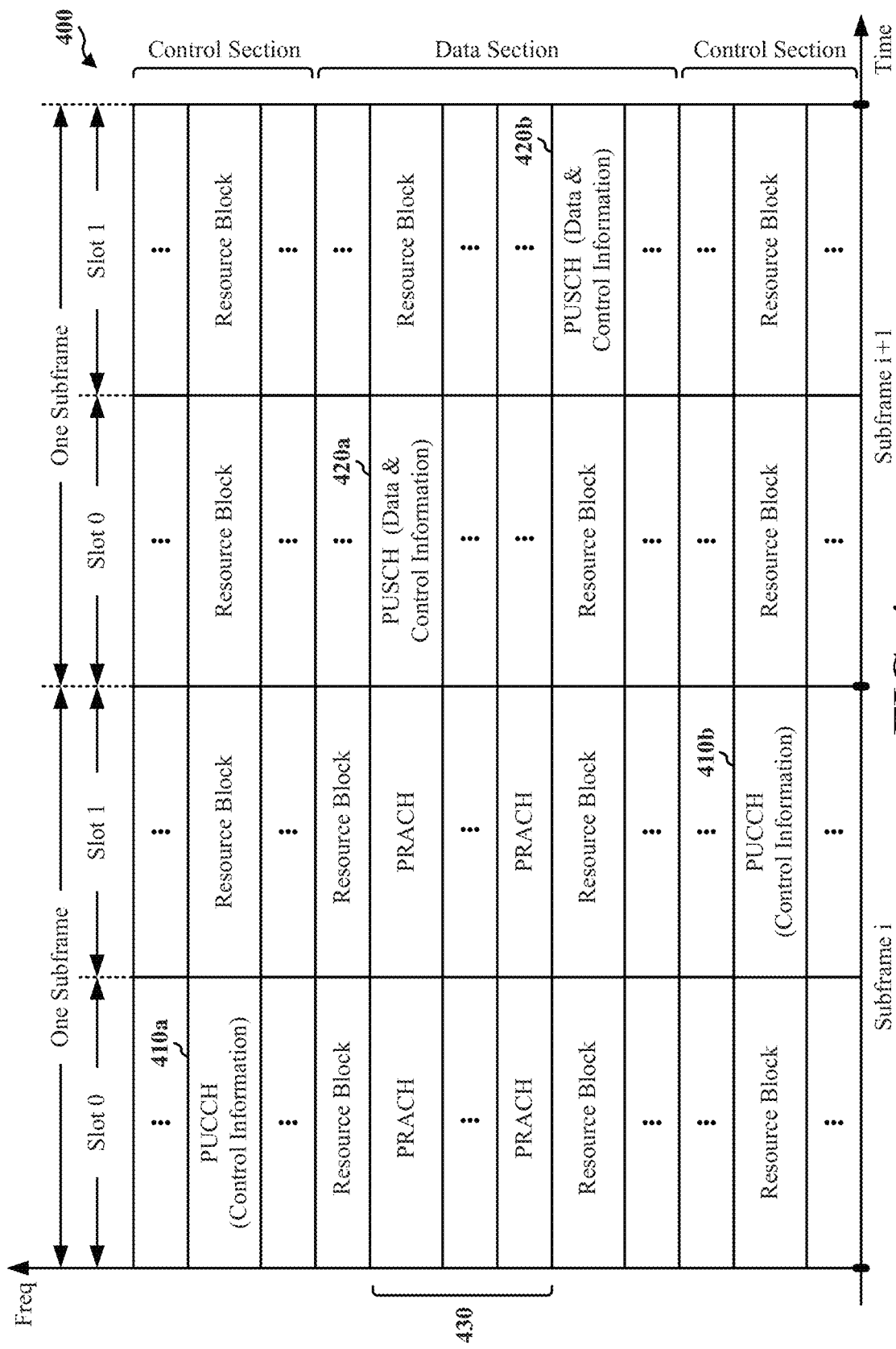
FIG. 4 is a diagram illustrating an example of an UL frame structure in LTE in aspects of the network architecture of FIG. 1.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
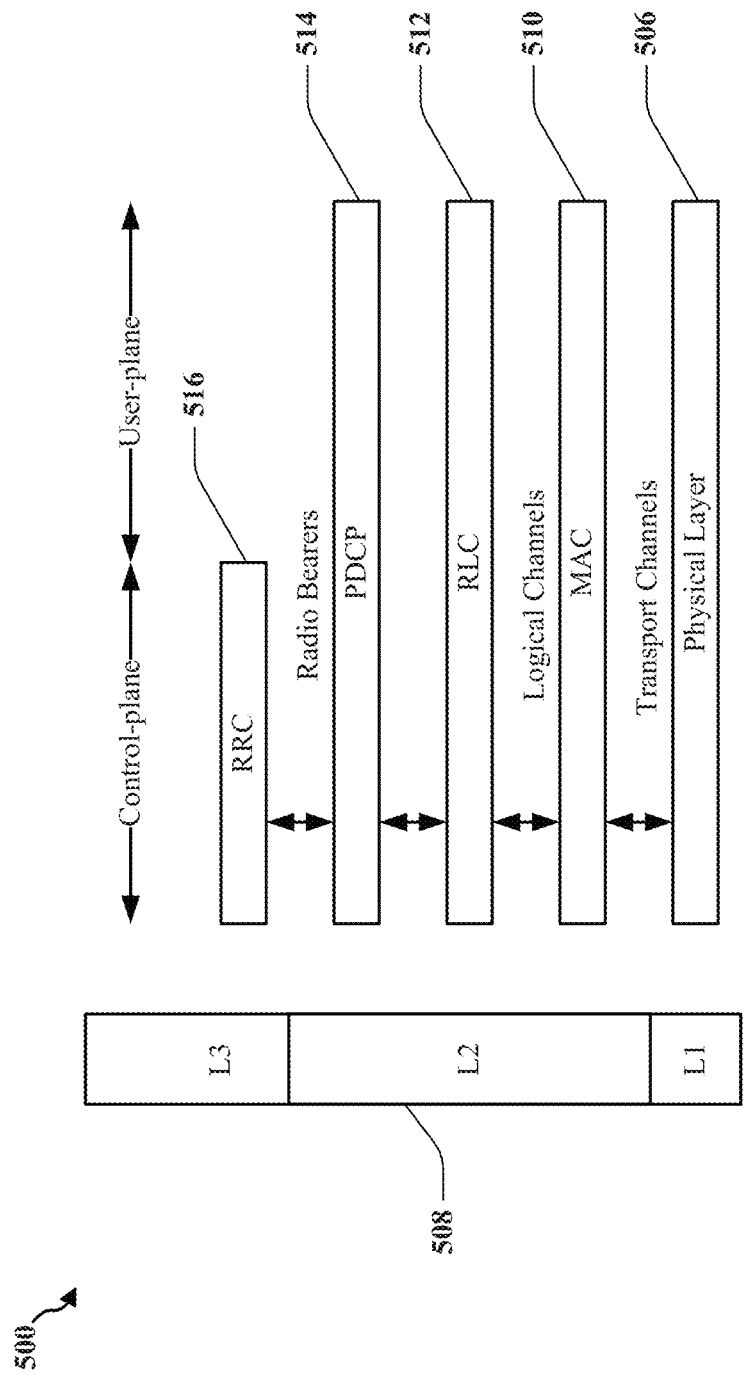
FIG. 5 is a diagram illustrating an example of a radio protocol architecture for the user and control planes in aspects of the network architecture of FIG. 1.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred. to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.), The PDCP sublayer 514 provides multiplexing between different radio bearers and logical channels. The PDCP sublayer 514 also provides header compression for upper layer data packets to reduce radio transmission overhead, security by ciphering, the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
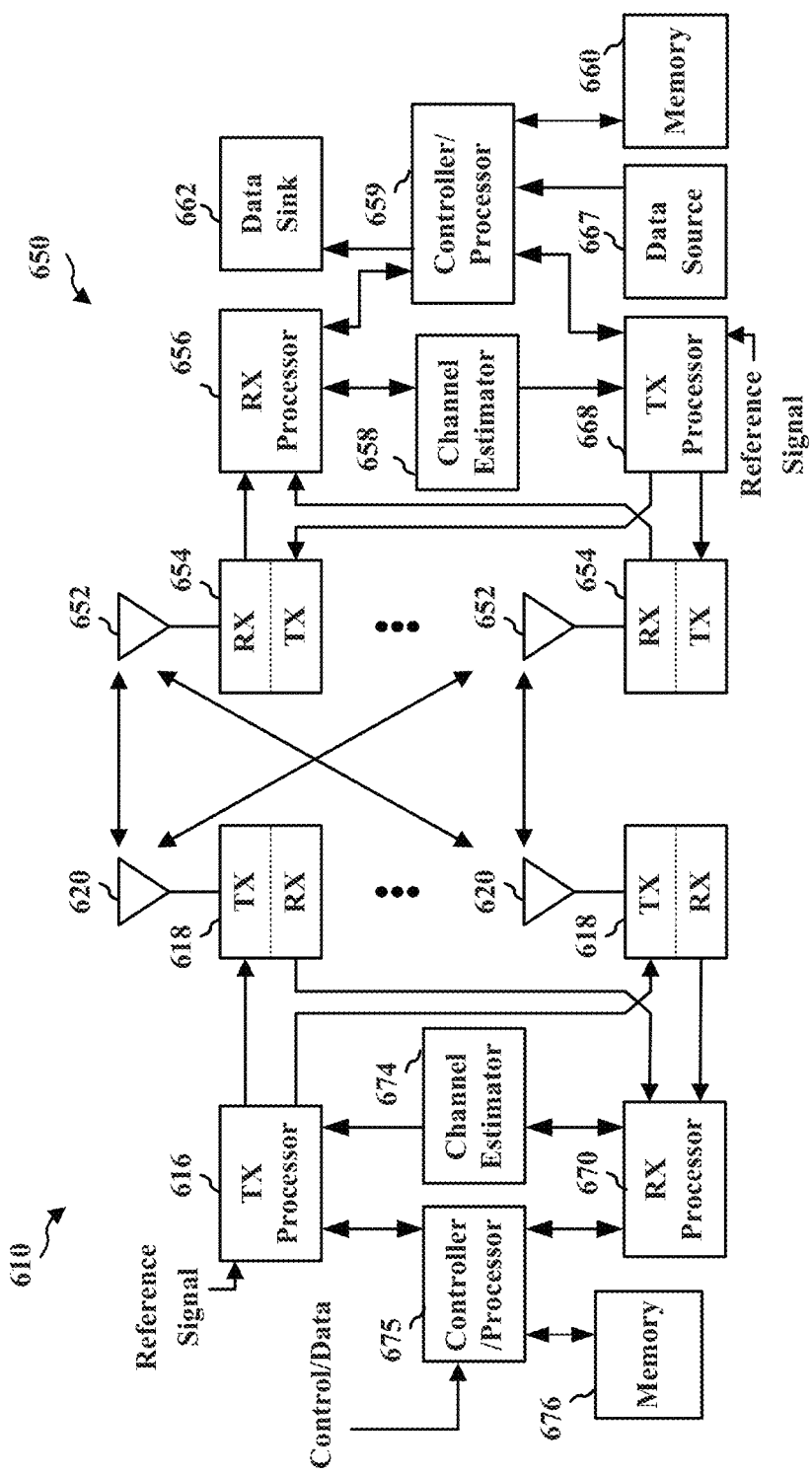
FIG. 6 is a diagram illustrating an example of an evolved Node B and user equipment in an access network in aspects of the network architecture of FIG. 1.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RE carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
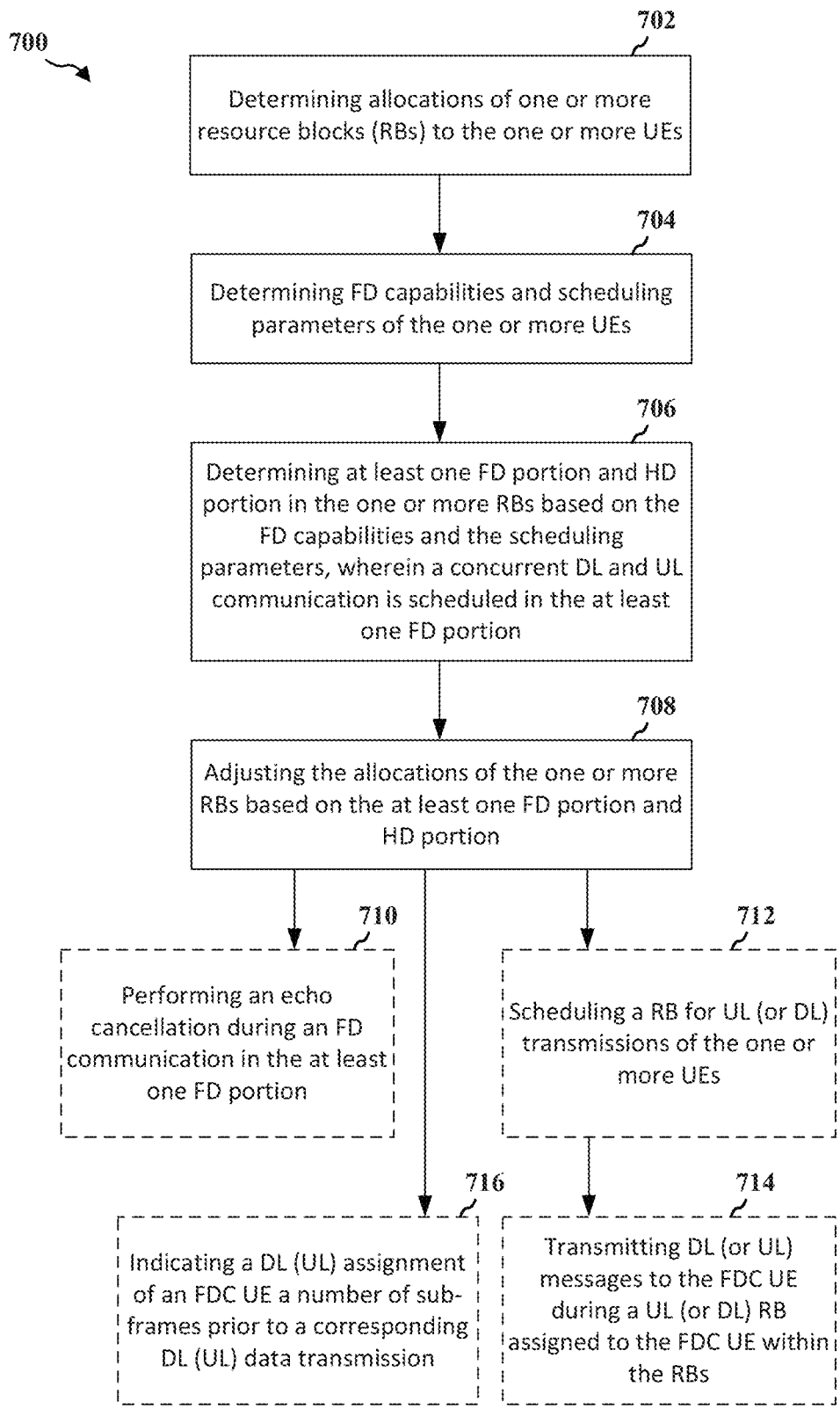
FIG. 7 is a flow chart of a method of wireless communication in aspects of the network architecture of FIG. 1.

FIG. 7 is a flow chart of an example of one aspect of a method 700 of wireless communication in aspects of the network architecture of FIG. 1. For example, method 700 may be performed by an eNodeB, such as eNodeB 106 (FIG. 1), executing scheduling component 130 (FIG. 1), as described herein.

At block 702, method 700 may include determining allocations of one or more RBs to one or more UEs. For example, in an aspect, eNodeB 106 may include scheduling component 130 that determines allocations of one or more RBs 140 to UEs 102 or FDC 150. In one aspect, for example, scheduling component 130 may include RB allocation determination component 132 that determines the RB allocations of UEs 102 or FDC UE 150 which may include LDL RBs and LUL RBs.

At block 704, method 700 may include determining FD capabilities and scheduling parameters of the one or more UEs. For example, in an aspect, scheduling component 130 may include FD capability determination component 134 that determines FD capabilities of UEs, e.g., UE 150 and UEs 102, by obtaining the FD capabilities pre-programmed in eNodeB 106 and/or stored in a network entity a-priori for FDC UE 150 and UEs 102, or by obtaining the FD capabilities from FDC UE 150 and UEs 102 by decoding broadcast messages from FDC UE 150 and UEs 102.

At block 706, method 700 may include determining at least one FD portion and at least one HD portion in the one or more RBs based on the FD capabilities and the scheduling parameters of the one or more UEs, wherein a concurrent DL and UL communication is scheduled in the at least one FD portion. For example, in an aspect, scheduling component 130 of eNodeB 106 may include RB FD portion and HD portion determination component 138 that determines at least one FD portion 142 and at least one HD portion 144 in the RBs 140 based on the FD capabilities of the FDC UE 150 and other UEs 102 (determined by ED capability determination component 134) and scheduling parameters of FDC UE 150 and other UEs 102, where concurrent DL and UL communication is scheduled in the FD portions 142. In these aspects, scheduling component 130 of eNodeB 106 may include scheduling parameter determination component 136 that determines scheduling parameters of FDC UE 150 and other UEs 102, e.g., traffic demands, UE requests, buffer size, channel conditions, signal quality, power, latency requirements, or QoS requirements. In some aspects, in the concurrent DL and UL communication, the DL communication is in a first RAT and the UL communication is in a second RAT different than the first RAT. In some aspects, the FD portions 142 are determined such that a primary link and a secondary link are synchronized during an FD communication in the ED portions 142. In some aspects, a UL communication and a DL communication during the FD portion are synchronized in time and frequency domains.

At block 708, method 700 may include adjusting the allocations of the one or more RBs based on the at least one FD portion and the at least one HD portion. For example, in an aspect, scheduling component 130 and/or RB allocation determination component 132 may adjust the allocations of RBs 140 to FDC UE 150 and other UEs 102 based on the determined FD portions 142 and HD portions 144. Accordingly, the adjusted RB allocations may provide FD communication for FDC UE 150 during one or more FD portions 142 allocated to MC UE 150. In some aspects, respective components of scheduling component 130 dynamically determine the FD portions 142 and the HD portions 144 in block 704 and adjust the allocations in block 706 at each scheduling opportunity.

Optionally, at block 710, method 700 may include performing an echo cancellation during an FD communication in the at least one FD portion in one or both of an analog radio frequency domain and a digital domain. For example, in an aspect, eNodeB 106 may support FD communication by performing digital cancellation during a FD portion 142 where FDC UE 150 is performing FD communication. In some aspects, eNodeB 106 may perform the digital cancellation only during FD sub-bands.

Optionally, at block 712, method 700 may include scheduling one or more mutually orthogonal RBs for UL transmissions or DL transmissions, respectively, of the one or more UEs. For example, in an aspect, eNodeB 106 may assign LUL RBs to a subset of UEs for UL transmission, thereby providing the subset of UEs with UL RBs that are orthogonal to each other in the time and frequency domains. Additionally or alternatively, eNodeB 106 may assign mutually orthogonal LDL RBs to a subset of UEs for DL transmission. In one aspect, for example, some of the LDL RBs may be assigned to the FDC UEs (e.g., FDC UE 150) within the subset of UEs for UL transmission, as long as those LDL RBs are not used by eNodeB 106 for transmitting special resources such as DL control, broadcast, pilot, or synchronization channels. In yet another aspect, for example, when the path loss between FDC UE 150 and other UEs within the subset of UEs is higher than a threshold, some of the LDL RBs may be assigned to FDC UE 150 for UL transmission. In some aspects, the assignment of the UL communication may be implicit, or may be separately communicated to FDC UE 150 through a control channel.

Further to the optional block 712, at block 714, method 700 may further include transmitting DL messages or UL messages, respectively, to the FDC UE during a UL RB or a DL RB, respectively, assigned to the FDC UE within the one or more mutually orthogonal RBs. In other words, at block 714, method 700 includes sending an opposite type of message relative to the type of communication for which the respective RB is schedule, thereby utilizing the RB as an FD resource. For example, in an aspect, the eNodeB 106 may establish FD communication with FDC UE 150 by transmitting on a subset of the LUL RBs (or LDL RBs) to the FDC UE 150 while receiving on that same subset of the LUL RBs (or LDL RBs) from the FDC UE 150.

Even further, at optional block 714, method 700 may further include at least one of indicating a DL assignment of the FDC UE a first number of sub-frames prior to a corresponding DL data transmission, and/or indicating a UL assignment of the FDC UE a second number of sub-frames prior to a corresponding UL data transmission. For example, in an aspect, eNodeB 106 and/or scheduling component 130 may indicate a DL assignment of FDC UE 150 a number of sub-frames, e.g., 3 sub-frames, prior to a corresponding DL data transmission. Accordingly, some present aspects support FD transmission, for example, by staggering PDCCH and PDSCH channels on DL transmissions during the LDL RBs. Alternatively or additionally, in some aspects, the uplink assignment sent over PDCCH for a corresponding uplink data channels, e.g., physical uplink shared channel (PUSCH), may be transmitted a number of sub-frames later, e.g., 4 sub-frames later.

Figure 8:
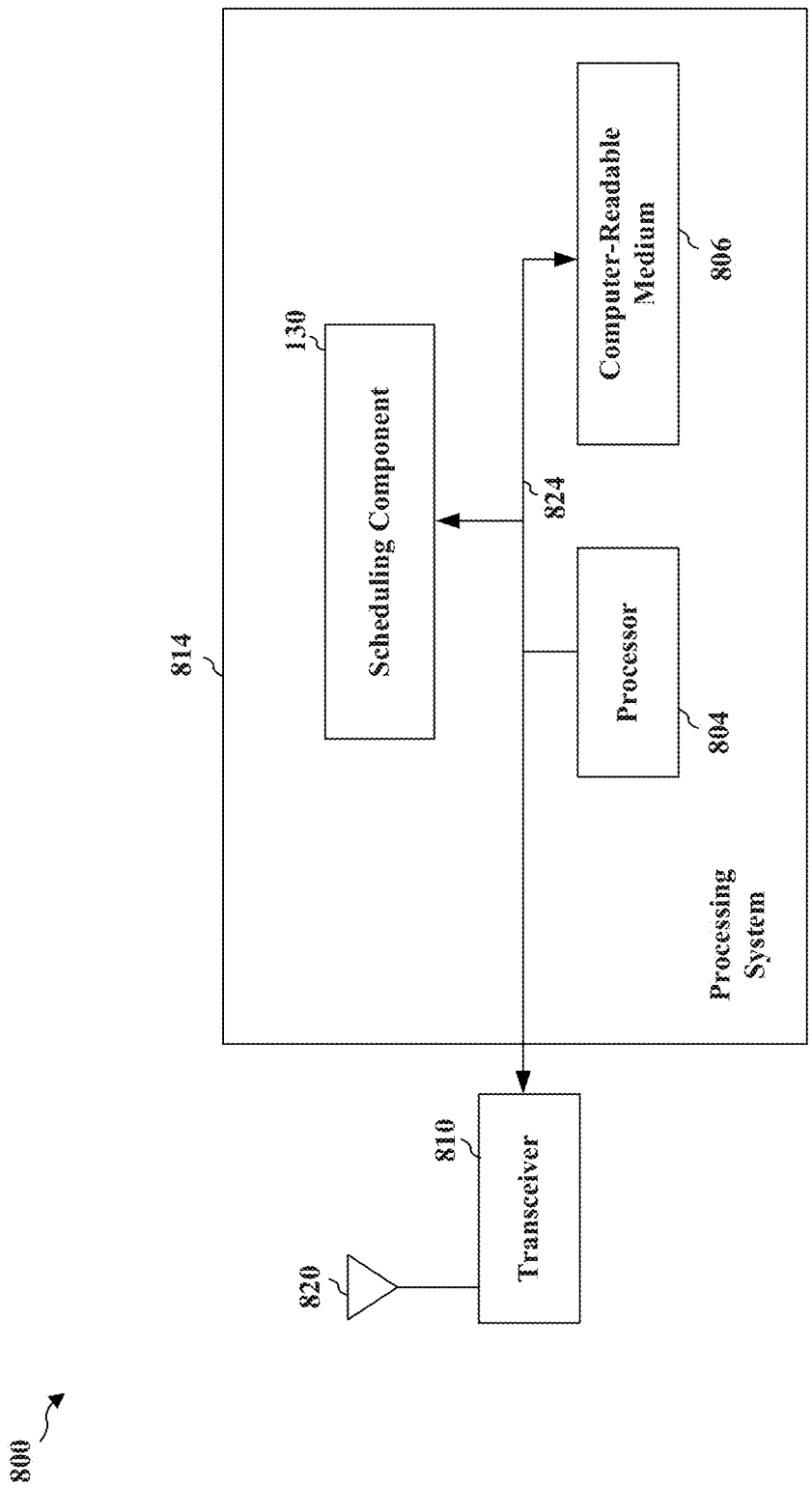
FIG. 8 is a diagram illustrating an example of a hardware implementation for an apparatus employing a processing system including aspects of the network architecture of FIG. 1.

FIG. 8 is a diagram illustrating an example of a hardware implementation for an apparatus 800 employing a processing system 814 to execute scheduling component 130 (FIG. 1) to perform FD scheduling, as describing herein. In an aspect, apparatus 800 may be the same as, or may be a component included within, eNodeB 106 (FIG. 1) or eNB 610 (FIG. 6). The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804, scheduling component 130, and the computer-readable medium 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The processing system 814 includes a processor 804 coupled to a computer-readable medium 806. The processor 804 is responsible for general processing, including the execution of software stored on the computer-readable medium 806. The software, when executed by the processor 804, causes the processing system 814 to perform the various functions described supra for any particular apparatus. The computer-readable medium 806 may also be used for storing data that is manipulated by the processor 804 when executing software. The processing system further includes scheduling component 130. The modules may be software modules running in the processor 804, resident/stored in the computer readable medium 806, one or more hardware modules coupled to the processor 804, or some combination thereof. The processing system 814 may be a component of the eNB 610 and may include the memory 676 and/or at least one of the TX processor 616, the RX processor 670, and the controller/processor 675.

In one configuration, the apparatus 800 for wireless communication includes means for determining allocations of one or more RBs to one or more UEs; means for determining FD capabilities and scheduling parameters of the one or more UEs; means for determining at least one FD portion and at least one HD portion in the one or more RBs based on the FD capabilities and the scheduling parameters of the one or more UEs, wherein a concurrent DL and UL communication is scheduled in the at least one FD portion; and means for adjusting the allocations of the one or more RBs based on the at least one FD portion and the at least one HD portion. The aforementioned means may be one or more of the aforementioned modules of the apparatus 800 and/or the processing system 814 of the apparatus 800 configured to perform the functions recited by the aforementioned means. As described supra, the processing system 814 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Several aspects of telecommunication systems have been presented with reference to various apparatus and methods. These apparatus and methods may be described in the this detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

It is understood that the specific order or hierarchy of steps in the processes disclosed is an illustration of one example of such an approach. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

In the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later conic to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using, the phrase "means for."

What is claimed is:

1. A method for providing full duplex (FD) wireless communication to an FD capable (FDC) user equipment (UE) among one or more UEs, comprising:
    determining allocations of one or more resource blocks (RBs) to the one or more UEs;
    determining FD capabilities and scheduling parameters of the one or more UEs;
    determining at least one FD portion and at least one half duplex (HD) portion in the one or more RBs based on the FD capabilities and the scheduling parameters of the one or more UEs, wherein a concurrent downlink (DL) and uplink (UL) communication is scheduled in the at least one FD portion;
    adjusting the allocations of the one or more RBs based on the at least one FD portion and the at least one HD portion; and
    transmitting DL messages from an access point to an FDC UE during an UL RB assigned to the FDC UE when a minimum path loss between the access point and one or more neighboring access points is greater than a path loss threshold.

2. The method of claim 1, wherein the concurrent DL and UL communication comprises a DL communication in a first radio access technology (RAT) and a UL communication in a second RAT different than the first RAT.

3. The method of claim 1, further comprising:
    performing an echo cancellation during an FD communication in the at least one FD portion in one or both of an analog radio frequency domain and a digital domain.

4. The method of claim 3, wherein the echo cancellation in the digital domain includes a digital cancellation that is performed only during FD sub-bands.

5. The method of claim 1, wherein the determining the FD capabilities of the one or more UEs comprises at least one of:
    obtaining the FD capabilities from a network entity; or
    obtaining the FD capabilities from the one or more UEs by decoding broadcast messages from the one or more UEs.

6. The method of claim 1, wherein the DL communication is associated with a primary link and the UL communication is associated with a secondary link, wherein the primary link and the secondary link are synchronized during an FD communication in the at least one FD portion.

7. The method of claim 1, wherein the UL communication and the DL communication during the at least one FD portion are synchronized in time and frequency domains.

8. The method of claim 1, further comprising:
    scheduling one or more mutually orthogonal RBs for UL transmissions of the one or more UEs; and
    transmitting DL messages to the FDC UE during a UL RB assigned to the FDC UE within the one or more mutually orthogonal RBs.

9. The method of claim 1, further comprising:
    scheduling one or more mutually orthogonal RBs for DL transmissions to the one or more UEs; and
    receiving UL messages from the FDC UE during a DL RB assigned to the FDC UE within the one or more mutually orthogonal RBs.

10. The method of claim 1, further comprising:
    receiving UL messages from an FDC UE during a DL RB assigned to the FDC UE when a minimum path loss between the FDC UE and the one or more UEs is greater than a path loss threshold.

11. The method of claim 1, further comprising:
    receiving UL messages from the FDC UE during the at least one FD portion when DL reference or control channels are not transmitted during the at least one FD portion.

12. The method of claim 1, further comprising:
    transmitting DL messages to the FDC UE during the at least one FD portion when there are no random access attempts from other UEs within the one or more UEs during the at least one FD portion.

13. The method of claim 1, wherein the determining the at least one FD portion and the at least one HD portion and the adjusting the allocations are performed dynamically at each scheduling opportunity.

14. The method of claim 1, wherein an allocation of the at least one FD portion is implicitly performed by allocating a frequency domain DL assignment or a frequency domain UL assignment to the FDC UE.

15. The method of claim 1, further comprising at least one of:
    indicating a DL assignment of the FDC UE a first number of sub-frames prior to a corresponding DL data transmission; and
    indicating a UL assignment of the FDC UE a second number of sub-frames prior to a corresponding UL data transmission.

16. The method of claim 15, wherein the DL assignment and the UL assignment are indicated in a physical downlink control channel (PDCCH) in long evolution (LTE), the corresponding DL data transmission is a physical downlink shared channel (PDSCH), and the corresponding UL data transmission is a physical uplink shared channel (PUSCH).

17. An apparatus for providing full duplex (FD) wireless communication to an FD capable (FDC) user equipment (UE) among one or more UEs, comprising:
    a processing system configured to:
        determine allocations of one or more resource blocks (RBs) to the one or more UEs;
        determine FD capabilities and scheduling parameters of the one or more UEs;
        determine at least one FD portion and at least one half duplex (HD) portion in the one or more RBs based on the FD capabilities and the scheduling parameters of the one or more UEs, wherein a concurrent downlink (DL) and uplink (UL) communication is scheduled in the at least one FD portion;

adjust the allocations of the one or more RBs based on the at least one FD portion and the at least one HD portion and;

transmit DL messages from an access point to an FDC UE during an UL RB assigned to the FDC UE when a minimum path loss between the access point and one or more neighboring access points is greater than a path loss threshold.

18. The apparatus of claim 17, wherein the processing system is further configured to perform at least one of:

indicating a DL assignment of the FDC UE a first number of sub-frames prior to a corresponding DL data transmission, wherein an allocation of the at least one FD portion is implicitly performed by allocating the DL assignment to the FDC UE; and indicating a UL assignment of the FDC UE a second number of sub-frames prior to a corresponding UL data transmission, wherein an allocation of the at least one FD portion is implicitly performed by allocating the UL assignment to the FDC UE.

19. A non-transitory computer-readable medium for providing full duplex (FD) wireless communication to an FD capable (FDC) user equipment (UE) among one or more UEs, comprising:

code for determining allocations of one or more resource blocks (RBs) to the one or more UEs;

code for determining FD capabilities and scheduling parameters of the one or more UEs;

code for determining at least one FD portion and at least one half duplex (HD) portion in the one or more RBs based on the FD capabilities and the scheduling parameters of the one or more UEs, wherein a concurrent downlink (DL) and uplink (UL) communication is scheduled in the at least one FD portion;

code for adjusting the allocations of the one or more RBs based on the at least one FD portion and the at least one HD portion and;

code for transmitting DL messages from an access point to an FDC UE during an UL RB assigned to the FDC UE when a minimum path loss between the access point and one or more neighboring access points is greater than a path loss threshold.

* * * * *